June 6, 1972   J. L. HARNED   3,667,816
VEHICLE WHEEL VELOCITY CONTROL SYSTEM AND METHOD
Filed Feb. 16, 1970   2 Sheets-Sheet 1

INVENTOR.
John L. Harned
BY
O. D. McGraw
ATTORNEY ated June 6, 1972

3,667,816
VEHICLE WHEEL VELOCITY CONTROL SYSTEM AND METHOD
John L. Harned, Grosse Pointe Woods, Mich., assignor to General Motors Corporation, Detroit, Mich.
Filed Feb. 16, 1970, Ser. No. 11,512
Int. Cl. B60t 8/12
U.S. Cl. 303—21 F
9 Claims

ABSTRACT OF THE DISCLOSURE

A vehicle brake system in which the wheel to be braked drives a positive displacement pump, the output fluid of which passes through a viscous orifice and also through a variable orifice in parallel flow relationship to the viscous orifice. The variable orifice is controlled to generate a pressure from the pump output through which the wheel brake is applied. A pressure reducing valve and a pressure relief valve are also provided. A modified system further uses a vehicle deceleration sensing mechanism to control the rate of wheel deceleration so that wheel deceleration is slightly greater than the synchronized deceleration obtained by control pressure feedback. The pump may be driven directly by the wheel or through a speed selector device having wheel and vehicle engine input drives, the selector device selecting the higher of the two input speeds for the pump drive.

---

The system and method of operation embodying the invention relate to a hydraulic control system for accurately controlling the rotational speed of a braked wheel. In one embodiment of the invention the system and method are well suited for use on a brake trailer test rig to measure tire and brake force characteristics. In this application the hydraulic control will accurately regulate wheel slip, allowing the instantaneous curve of brake force coefficient versus wheel slip to be measured. The control system may also provide an anti-lock brake control for a vehicle such as passenger car. The system will prevent wheel lock during heavy braking. It obtains peak tire braking force by utilizing an inertia vehicle velocity reference to compute the optimum wheel slip.

Figure 1:
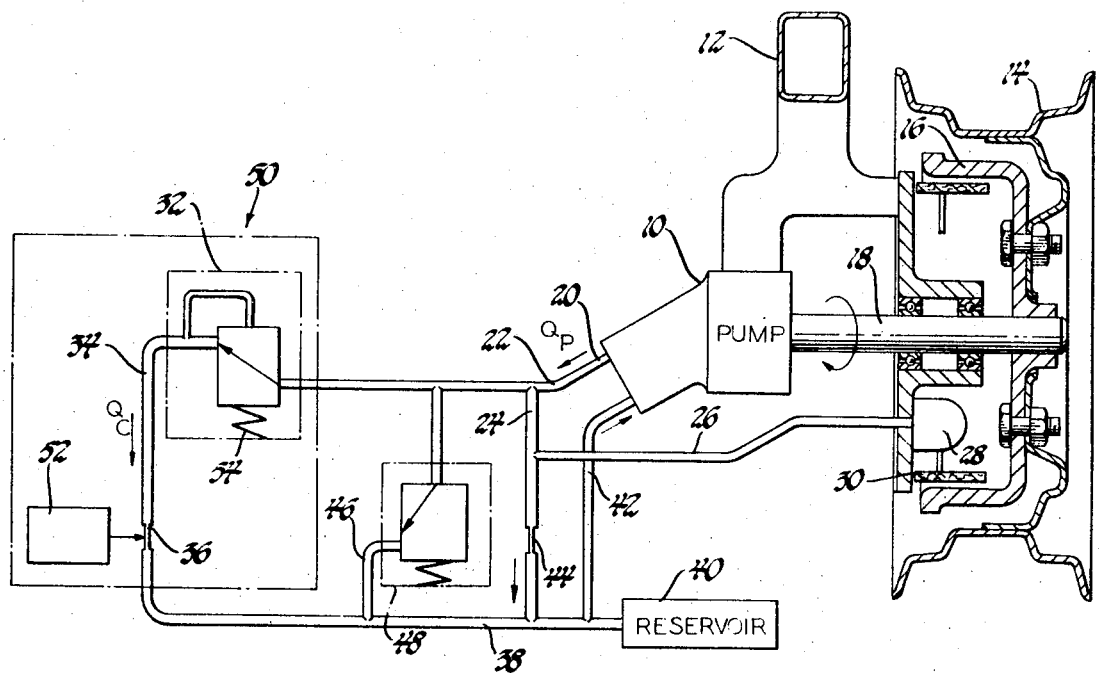
FIG. 1 is a schematic illustration of a brake embodying the invention with parts broken away and in section.

The hydraulic servo wheel velocity control system, shown schematically in FIG. 1, includes a positive displacement pump 10 mounted on a suitable part of the support 12 of the vehicle in which the system is mounted. The pump 10 is connected to the wheel 14 and brake drum 16 by means of axle 18 so that the pump is driven by rotation of the wheel. The pump outlet 20 is connected through conduits 22, 24, and 26 directly to the wheel brake cylinder 28 so that the developed pump output pressure also acts as the brake apply pressure. Wheel brake cylinder 28 acts in the usual manner to apply the brake shoes 30 to the friction surface of the brake drum 16 when the wheel cylinder is pressurized. The pump outlet hydraulic fluid flow passes through conduit 22 and is delivered to the pressure reducing valve 32. It then passes through conduit 34 and variable orifice 36. The outlet side of orifice 36 is connected to conduit 38, which, in turn, is connected to reservoir 40 and the pump inlet 42. Conduit 24 is connected with viscous orifice 44 and the outlet of viscous orifice 44 is connected to conduit 38, so that orifice 44 is in parallel fluid flow relation with valve 32 and orifice 36.

Another conduit 46 extends between conduit 22 and conduit 38 and contains the pressure relief valve 48, which is in parallel flow relation to orifices 36 and 44. Hydraulic fluid does not normally flow through the relief valve 48, this valve being provided for protection against overpressurization.

The series connected pressure reducing valve 32, conduit 34, and variable orifice 36 operate together to form a flow control valve 50. A suitable brake signal actuating command device 52 is provided to control the modulated opening and closing of variable orifice 36. When the pump outlet pressure is greater than the preload force on valve spring 54 of pressure reducing valve 32, the pressure downstream of this valve remains constant. A constant pressure across an orifice provides an arrangement wherein the orifice flow is a direct function of the orifice restriction. The variable orifice 36 is used to provide the controlled flow $Q_c$ which represents the wheel velocity command signal.

When the vehicle on which this system is installed is operating at some road speed, without any braking action being required, the variable orifice 36 is fully open. While this system may be used to brake a vehicle in the usual manner, it is particularly useful on a trailer having the control wheel mounted thereon for brake or tire test purposes, the trailer being maintained at a desired constant linear speed. When the variable orifice 36 is fully open, the orifice pressure drop does not exceed the preload of pressure reducing valve spring 54 and that pressure level, in turn, may correspond to the retractor spring pressure setting of the wheel brake, assuming that a drum-type brake is utilized. At this time practically all of the pump outlet flow $Q_p$ passes through the variable orifice 36 and very little of the flow passes through the viscous orifice 44, since the viscous orifice provides a much greater restriction.

As a brake wheel actuating command is impressed on orifice 36 by device 52, the variable orifice is adjusted to provide a greater restriction. The orifice pressure drop will then increase to the pressure reducing valve spring preload. Further closure of orifice 36 causes the pump output pressure in conduits 22, 24 and 26 to further increase, which activates the pressure reducing valve 32, as well as initiating the application of brake apply pressure to the wheel brake cylinder 28 and commencing brake actuation.

Once the pump pressure causes the pressure reducing valve 32 to operate, the impedance of the flow path through this valve and the series connected variable orifice 36 becomes infinite. Thus, the flow $Q_c$ through conduit 34 is independent of pump outlet pressure and is only dependent upon the amount of restriction of the variable orifice 36. This restriction can be set as desired by the operator. In the usual motor vehicle, the restriction can be set by means of a brake pedal. In a brake trailer test rig, it can be set by other desired controls.

As the hydraulic fluid flow $Q_c$ is reduced, the flow difference between pump outlet flow $Q_p$ and the flow $Q_c$, $(Q_p - Q_c)$, passes through the viscous orifice 44. While this orifice may be considered to be fixed for convenience, it may be adjustable to set the desired open-loop gain. As the flow $(Q_p - Q_c)$ increases, the pump outlet pressure increases, thereby increasing the wheel brake apply pressure and the braking effect of the shoes 30 against the brake drum 16, causing the wheel 14 to decelerate. A slowing down of the drive mechanism for pump 10 causes a reduction in the pump outlet flow $Q_p$ which, in turn, causes a direct reduction of the hydraulic flow $(Q_p - Q_c)$ through viscous orifice 44 since the flow $Q_c$ is independent of the pump pressure. Since the pump outlet pressure has decreased, the brake apply pressure is decreased. This interaction between brake apply pressure and wheel speed clearly describes a stable operating condition for a fixed setting of the hydraulic flow $Q_c$. The brake pressure increases as the wheel speeds up, slowing the wheel down and causing the brake pressure to decrease. An equilibrium point exists when the brake torque equals the tire torque, and synchronized deceleration occurs.

Figure 2:
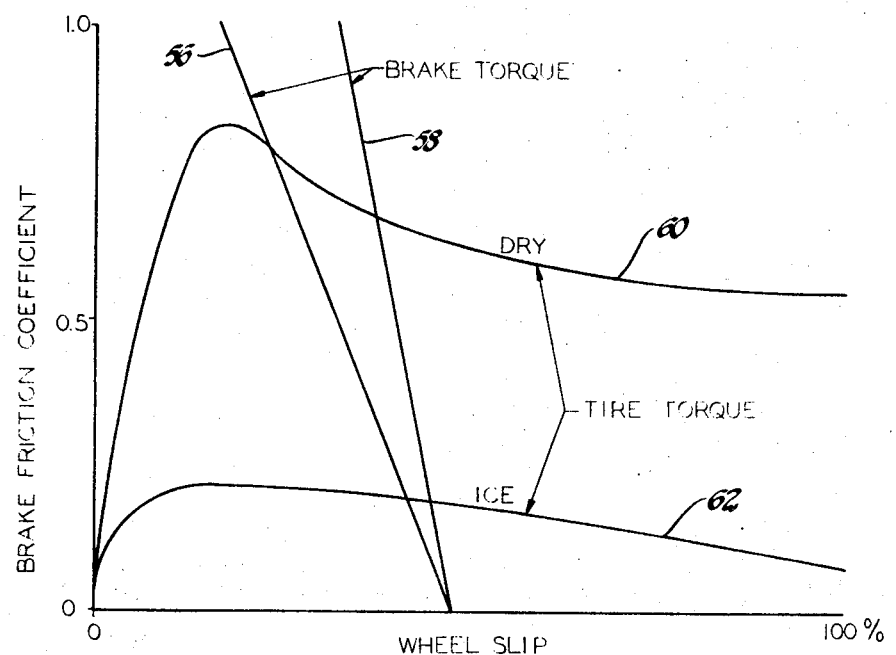
FIG. 2 is a plot of brake torque and tire torque curves obtainable by a system embodying the invention.

This stable operating capability is illustrated graphically by the system control trajectories plotted in FIG. 2 and labeled as brake torque curves 56 and 58. The flow $Q_c$ can be directly related to a wheel slip command signal since maximum $Q_c$ exists at zero wheel slip and 100% wheel slip command corresponds to zero $Q_c$ flow. The brake torque trajectory slope is a function of the restriction of viscous orifice 44. This trajectory slope becomes steeper as the amount of restriction of the viscous orifice 44 is increased. Thus, brake torque curve 58 represents a trajectory opening when the viscous orifice 44 is more restrictive than the orifice utilized in obtaining curve 56. The tire torque curves 60 and 62 represent the brake friction coefficient obtainable throughout the wheel slip range on dry concrete road surfaces and on ice covered road surfaces, respectively.

Figure 3:
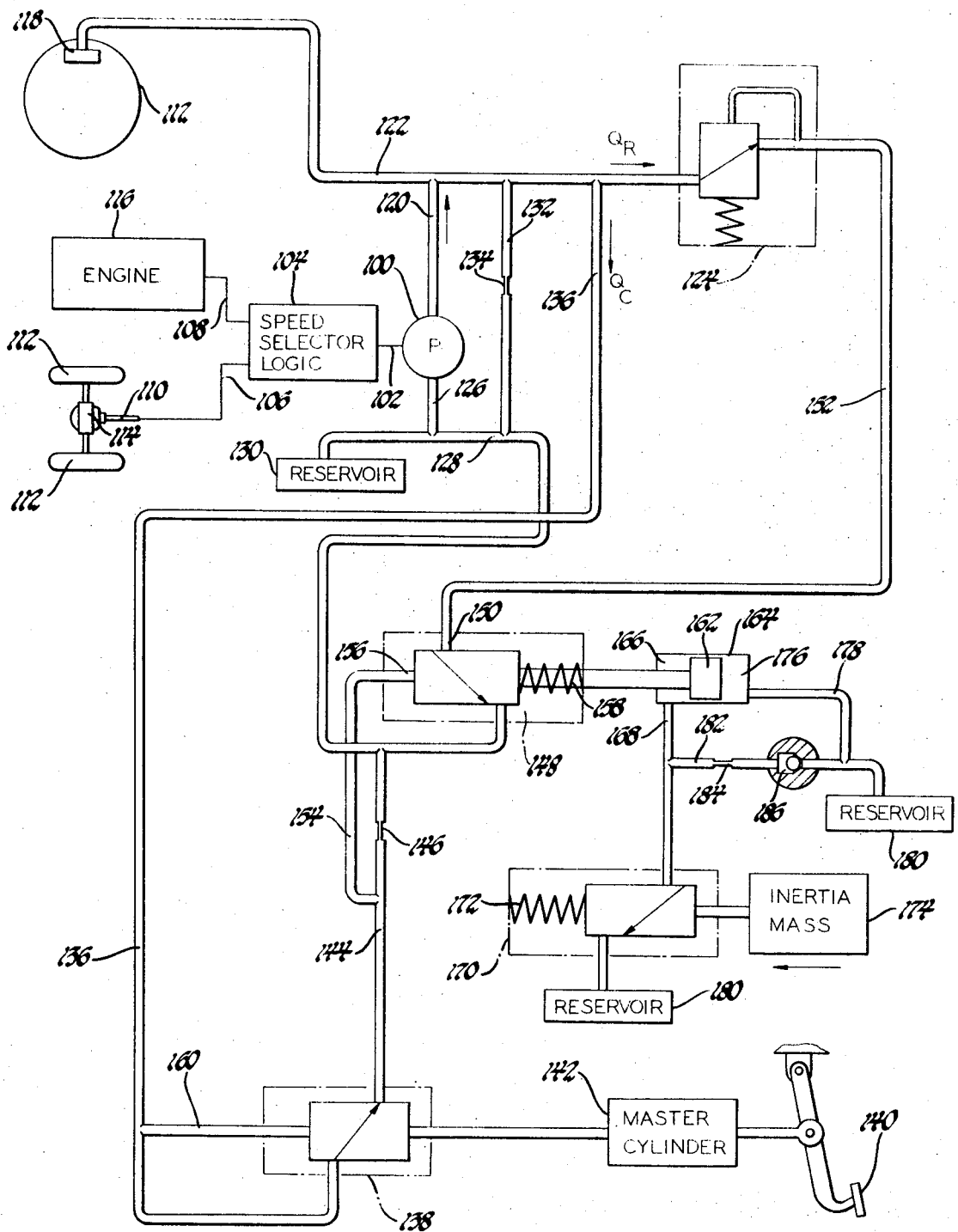
FIG. 3 is a schematic illustration of another embodiment of the invention, with parts broken away and in section.

The system shown in FIG. 3 is a modification and further development of the system shown in FIG. 1. The system includes a fixed displacement pump 100 having a drive 102 connected with the speed selector logic device 104. This device permits the pump to be driven by either the wheel drive 106 or the engine drive 108. The device 104 selects the faster of the two drives for driving the pump. Drive 106 is illustrated as being driven from a vehicle propeller shaft 110, which drives the rear wheels 112 of a vehicle through a differential mechanism 114. Drive 106 may be directly from the wheel if desired. The other drive 108 is connected to be driven by the vehicle engine 116 and may be so geared so to have a 1:1 speed relationship with drive 106 when the vehicle is operating at road speed with no wheel slip.

The pump output conduit 120 is connected to conduit 122, which, in turn, is connected to wheel brake cylinder 118 and to the inlet of pressure reducing valve 124. The pump inlet conduit 126 is connected to the return conduit 128 and reservoir 130. Conduit 132 interconnects conduits 122 and 128 in parallel to pump 100 and contains the gain orifice 134. Conduit 136 connects conduit 122 to the inlet of control valve 138. This is a normally open valve which is urged in the closed direction by brake pedal 140 and master cylinder 142. The control valve outlet is connected to conduit 144, which contains control orifice 146. The outlet of control orifice 146 is connected to return conduit 128. A reference valve 148 has its outlet connected to return conduit 128 and its inlet 150 connected with conduit 152. The outlet of pressure reducing valve 124 is connected to conduit 152 to deliver reduced pressure to the inlet 150 of reference valve 148. A conduit 154 connects the other inlet 156 of valve 148 to conduit 144 upstream of control orifice 146 but downstream of control valve 138. Thus the pressure in conduit 144 at this connection urges the reference valve 148 to the right against spring 158, as seen in the drawing. Conduit 160 similarly connects the end of control valve 138 to conduit 136 so that pressure in conduit 136 urges valve 138 to the right against the force exerted by master cylinder 142.

One end of reference valve 148 is mechanically connected to a piston 162 of rate cylinder 164. Rate cylinder 164 has a chamber on each side of piston 162, with the chamber 166 adjacent reference valve 148 being connected by conduit 168 to the outlet of rate valve 170. This valve is urged to the right by spring 172 and to the left, when the vehicle is decelerating, by inertia mass 174. The other chamber 176 of rate cylinder 164 is connected by conduit 178 to reservoir 180. This reservoir is also connected to the inlet of rate valve 170. A conduit 182 connects conduits 168 and 178 through an orifice 184 in series with check valve 186.

The operation of the system shown in FIG. 3 will now be described. The system command input reflecting brake force demand is master cylinder pressure from the master cylinder 142 to the control valve 138, as modulated by the driver. As the master cylinder pressure is increased, the command velocity is continually reduced through the control system to decrease wheel speed and increase wheel slip. As wheel slip increases with increased brake force, the brake apply pressure increases and, through feedback action, causes the command change in velocity to stabilize at some wheel slip value. As long as the wheel slip remains within the positive slope region of the brake force coefficient versus percent wheel slip curve (for example, curve 60 of FIG. 2) the pressure control dictates the system operation. However, when the driver increases master cylinder pressure above the peak pressure allowed by the tire friction capacity, the vehicle deceleration control loop becomes dominant. This loop acts to maintain the wheel deceleration at the value corresponding to the peak tire brake force. Therefore, command velocity is continuously varied to achieve a rate of change matching the vehicle deceleration.

Much of the circuitry shown in FIG. 3 is comparable to the control system of FIG. 1. Under accelerating and steady state road conditions of operation, when no braking is required by the operator, the control valve 138 is fully open. The control flow $Q_c$ passing through conduit 136, control valve 138 and conduit 144, also passes through control orifice 146 and a small pressure is generated on the upstream side of the orifice. This pressure is transmitted through conduit 154 so that it acts on one end of reference valve 148. The preload of spring 158 is so adjusted that the small control orifice pressure can overcome it, causing movement of the normally closed reference valve rightwardly to a partially open position. Thus the reference valve spool tracks the speed of pump 100 so that flow $Q_c$ remains constant. Since the reference valve 148 controls the flow $Q_r$ through pressure reducing valve 124 and conduit 152, flow $Q_r$ will vary directly with pump speed. By suitably shaping the valve ports, the position of the spool of reference valve 148 becomes a direct measure of wheel speed. The series connected orifice 184 and check valve 186 of the closed loop rate circuit prevent the rate piston 162 from impeding movement of the spool of reference valve 148 when the valve spool is moving in a direction to open further.

Application of master cylinder pressure against the right end of the spool of control valve 138 will cause that spool to move leftwardly, closing off the connection to conduit 144. This eliminates fluid flow $Q_c$ through conduit 136 and immediately diverts the equivalent of this flow through conduit 132 and the gain orifice 134, causing a large pressure rise in conduit 122 and the wheel brake cylinder 112. This pressure is fed back to the control valve through conduits 136 and 160 and acts on the other end of the control valve spool to oppose master cylinder pressure. In addition to providing hydraulic feel to the brake pedal, it causes the control valve 138 to partially reopen. This action is further reenforced by leftward movement of the spool of reference valve 148 in the closing direction due to loss of control orifice pressure in inlet 156 occasioned by loss of flow $Q_c$. Any reduction in flow $Q_r$ through conduit 152 by virtue of the closing movement of reference valve 148 increases the flow through the gain orifice 134. With a steady master cylinder pressure applied, the steady state operating conditions established include re-establishment of fluid flow $Q_c$ through conduit 136, control valve 138, and control orifice 146; and repositioning of the spool of reference valve 148 to a slightly more closed position to sufficiently reduce fluid flow $Q_r$ through conduit 152 to generate the additional fluid flow required through gain orifice 134 to support the higher brake pressure in conduit 122.

When a low deceleration stop is being made on a high friction coefficient road surface, the steady state operating condition described above applies, but the speed of pump 100 slightly decreases in response to wheel synchronized deceleration. Due to the feedback action existing between the control valve 138 and reference valve 148, the reference valve closes off at a synchronized rate while control flow $Q_c$ remains relatively constant. The rate of movement in the closing direction of the spool of reference valve 148 is limited by the rate cylinder 164 and piston 162, and the action of rate valve 170 in the closed circuit. Vehicle deceleration acts on the inertia mass 174, causing it to move to the left against the rate valve spring 172 until a balanced condition is reached. This movement modifies the opening of rate valve 170, modifying the speed with which chamber 166 can be evacuated by movement of piston 162 as the reference valve spool tries to move leftwardly. The maximum rate allowed by the rate control circuit is slightly greater than the synchronized rate.

When the driver applied master cylinder pressure acts in the above-noted manner to generate a wheel brake apply pressure at wheel brake cylinder 118 which exceeds the peak brake apply pressure permitted by the tire-to-road friction force being attained, the anti-lock control action commences. Due to the permanent force unbalance, the spool of the control valve 138 moves leftwardly, completely closing off and reducing flow $Q_c$ to zero. Thus the control orifice pressure in conduit 154 and acting on the left end of the spool of reference valve 148 becomes zero. The reference valve spool then moves to the left further, causing a reduction in flow $Q_r$. Without some limitation on the rate of closure of the reference valve spool, $Q_r$ would rapidly reduce to zero, causing the wheel to approach a lockup or slide condition. The needed rate limitation is provided by the rate control circuit. As earlier described, this is a closed loop control whereby vehicle deceleration is fed back and used to adjust the rate valve opening to provide a wheel deceleration slightly greater than the synchronized wheel deceleration.

Since the pump 100 is driven by the wheel or wheels 112, the pump flow will be zero when the wheel 112 locks up and the vehicle is standing still. Then, the brake pressure in wheel brake cylinder 118 would also be zero. Since this is an undesirable condition, the dual speed pump drive arrangement, including the speed selector logic device 104, is utilized. This device may consist of overrunning clutches with wheel and vehicle drive inputs and a pump drive output so that the higher speed drive automatically drives the pump drive. Therefore, when the vehicle is not moving, the engine 116 drives the pump and provides steady state brake pressure.

What is claimed is:

1. A vehicle wheel velocity control system comprising:
   a rotatable wheel to be braked having hydraulic pressure actuatable braking means,
   a hydraulic pump operatively connected to be driven by said wheel and having a hydraulic fluid inlet and a hydraulic fluid outlet, said outlet being connected to said braking means in fluid pressure relation,
   flow control mechanism including a pressure reducing valve and variable restriction means connected with said pump outlet,
   viscous restriction means providing a gain and connected with said pump outlet in parallel flow relation with said flow control mechanism,
   said variable restriction means and said viscous restriction means having outlets connected to return hydraulic fluid to said pump inlet,
   and means for generating a brake actuating command, said generating means being connected to control said variable restriction means throughout a range between an opening sufficiently large to allow unrestricted pump outlet fluid flow therethrough and a closure causing pump outlet pressure to increase and to be delivered to said braking means in a range of brake actuating pressure according to the brake actuating command.

2. The wheel velocity control system of claim 1 further comprising:
   a pressure relief valve in parallel fluid flow relation with said flow control mechanism and with said viscous restriction means and acting to limit pressure available to said braking means.

3. The wheel velocity control system of claim 1, further comprising:
   a second drive member for said pump driving independently of said wheel and acting to drive said pump when said wheel would otherwise drive said pump at a lesser speed than would said second drive member,
   and means selecting the pump drive member as said wheel or said second drive member in accordance with the relative driving speeds thereof.

4. The wheel velocity control system of claim 1 in which
   said brake actuating command generating means includes a brake pedal and vehicle linear velocity change sensing means,
   said variable restriction means includes
      a normally open control valve operatively connected to said brake pedal for movement to restrict fluid flow therethrough in accordance with the amount of braking effort desired by the vehicle operator,
      a control orifice connected to the output side of said control valve and delivering fluid flow therethrough to said reservoirs,
      and a normally closed reference valve having a first inlet receiving fluid from said pressure reducing valve and an outlet for delivering fluid to said reservoir and a second inlet receiving pressurized fluid from a point fluidly intermediate said control valve and said control orifice urging said reference valve toward the open position connecting said first inlet and said outlet,
      and vehicle deceleration responsive means acting on said reference valve and modifying the rate of closing thereof in inverse relation to vehicle deceleration.

5. The method of controlling the rotational velocity of a vehicle wheel during braking comprising the steps of:
   (a) generating a pressurizable fluid flow proportional to wheel rotational velocity,
   (b) restricting the fluid flow in first and second parallel flow circuits and delivering brake actuatable pressure from upstream of the restrictive points of the parallel flow circuits to a vehicle wheel brake, the restrictive action in the second parallel flow circuit being normally sufficiently slight to prevent pressurization of the fluid at the vehicle wheel brake to a pressure level causing brake actuation,
   (c) and increasing the restrictive action in the second parallel flow circuit in accordance with brake demand to increase pressurization of the fluid at the vehicle wheel brake and increase fluid flow through the first parallel flow circuit and causing retardation of the rotational velocity of the braked vehicle wheel and thereby causing a decrease in fluid flow in the first parallel flow circuit to decrease brake apply pressure to balance brake torque againt wheel torque.

6. The method of claim 5, in which step (c) establishes a constant flow through the second parallel flow circuit independent of pressure generated by the restrictive action in the first parallel flow circuit to establish the stable condition in which the pressure at the vehicle wheel brake varies directly with wheel rotational velocity.

7. The method of claim 5, comprising additional steps in which (d) the second parallel flow circuit is restricted downstream of the restrictive point of steps (b) and (c) to provide a control pressure, (e) a third parallel flow circuit is restricted in inverse relation to the control pressure of step (c) to permit flow through the third parallel flow circuit to vary directly with wheel rotational velocity.

(f) and controlling the rate of change in restriction of the third parallel flow circuit in accordance with vehicle deceleration to provide a slightly greater wheel deceleration than the synchronized wheel deceleration otherwise provided during steady state braking in which pressure at the vehicle wheel brake varies directly with wheel rotational velocity.

8. The method of claim 5 in which (d) the restrictive action in the second parallel flow circuit is varied in accordance with a wheel slip limiting command.

9. The method of claim 5 in which the pressurizable fluid flow generated in accordance with step (a) is generated in accordance with the rotational velocity of another vehicle rotating element when the wheel rotational velocity decreases until it is less than the rotational velocity of the other vehicle element.

References Cited

UNITED STATES PATENTS

| | | | |
|---|---|---|---|
| 3,004,801 | 10/1961 | Wrigley | 303—21 F UX |
| 3,124,220 | 3/1964 | Kell | 303—21 F |
| 3,463,555 | 8/1969 | Ryskamp | 303—21 F |
| 3,539,227 | 11/1970 | Drutchas et al. | 303—21 F |

MILTON BUCHLER, Primary Examiner

J. J. McLAUGHLIN, Assistant Examiner

U.S. Cl. X.R.

188—181 A